United States Patent [19]

Seros et al.

[11] Patent Number: 5,263,741
[45] Date of Patent: Nov. 23, 1993

[54] FUNCTIONAL BELT GUIDE WITH WEBBING LOCATOR

[75] Inventors: Noreen M. Seros, Southgate; Martin L. Bray, Rochester Hills, both of Mich.

[73] Assignee: Ford Motor Company, Dearborn, Mich.

[21] Appl. No.: 914,670

[22] Filed: Jul. 17, 1992

[51] Int. Cl.$^5$ .............................................. B60R 22/00
[52] U.S. Cl. ...................................... 280/808; 297/483
[58] Field of Search .................. 280/801, 808; 297/468, 297/483

[56] References Cited

U.S. PATENT DOCUMENTS

| | | | |
|---|---|---|---|
| 3,521,901 | 7/1970 | Wackym | 280/150 |
| 4,083,602 | 4/1978 | Mori et al. | 297/389 |
| 4,236,755 | 12/1980 | Pollitt et al. | 297/483 |
| 4,247,131 | 1/1981 | Fiehl | 280/808 |
| 4,323,278 | 4/1982 | Sukopp et al. | 280/801 |
| 4,482,187 | 11/1984 | Nagashima et al. | 297/468 |
| 4,491,344 | 1/1985 | Föhl | 280/808 |
| 4,541,654 | 9/1985 | Jonasson | 280/801 |
| 4,632,426 | 12/1986 | Dallwig et al. | 280/808 |
| 4,727,631 | 3/1988 | Jahn | 24/633 |
| 4,730,875 | 3/1988 | Yoshitsugu | 297/468 |
| 4,799,737 | 1/1989 | Greene | 297/468 |
| 4,826,250 | 5/1989 | Ibanez | 297/483 |
| 4,871,192 | 10/1989 | Escaravage et al. | 280/808 |

FOREIGN PATENT DOCUMENTS 0229744  9/1989  Japan ................................ 280/808

*Primary Examiner*—Margaret A. Focarino
*Assistant Examiner*—Paul Dickson
*Attorney, Agent, or Firm*—Roger May; Daniel M. Stock

[57] ABSTRACT

A functional, adjustable belt guide for receiving the webbing of a shoulder strap of a vehicle seat belt system is disclosed which adjustably directs the path of a shoulder strap across the body of an occupant of a seat for comfort. The adjustable belt guide includes a guide body mountable to the back portion of a seat, and the webbing may be adjusted laterally in position, inward or outward, relative to a seat, to vary the path of the shoulder strap across the body, enabling the occupant of a seat to vary the path of the shoulder strap to minimize neck chafing and/or shoulder pressure. Also disclosed is a vehicle seat belt system incorporating the functional, adjustable belt guide.

14 Claims, 3 Drawing Sheets

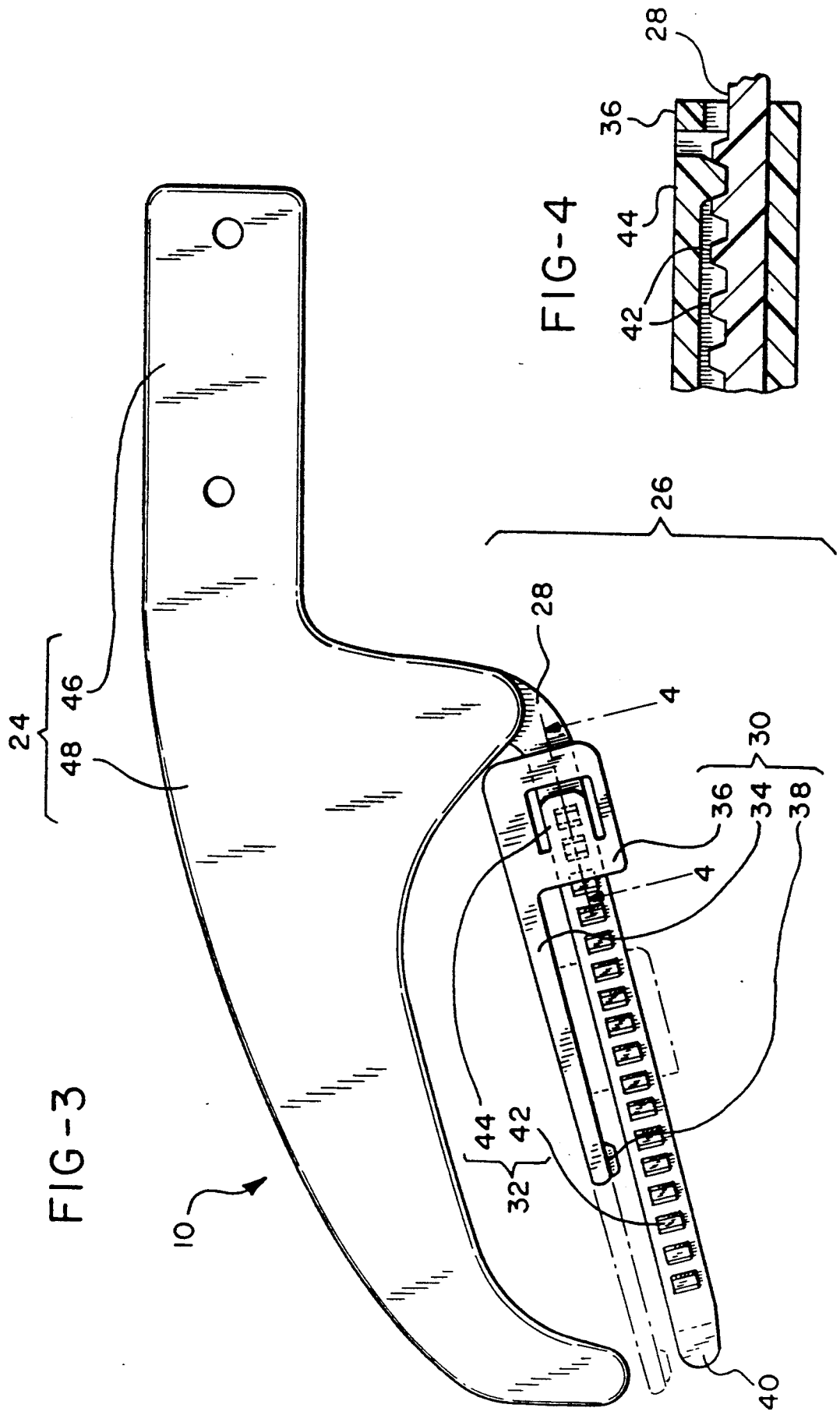

FUNCTIONAL BELT GUIDE WITH WEBBING LOCATOR

BACKGROUND OF THE INVENTION

The present invention relates to an adjustable belt guide for vehicle seat belt systems, and in particular, to a belt guide having a webbing locator which functions to laterally adjust the position and path of a shoulder belt for the comfort of the occupant.

Vehicle seat belt systems are well known which include shoulder straps crossing diagonally across the occupant of a seat. Belt guides are typically used to receive the belt from a recoiling, tensioning device, and guide the seat belt in a zone which is easily accessible to the occupant. In use, shoulder straps are most effective when worn snugly across the body. However, the tensioning devices designed to provide a snug fit for the average male occupant have also produced neck chafing and shoulder pressure for many others, particularly smaller sized occupants.

The need remains for vehicle seat belt systems having shoulder straps which provide a snug fit, but which are comfortable for occupants of various sizes.

SUMMARY OF THE INVENTION

The present invention satisfies that need by providing a functional, adjustable belt guide for receiving the webbing of a shoulder strap of a vehicle seat belt system, and for adjustably directing the path of the shoulder strap across the body of an occupant of a seat for comfort. The adjustable belt guide includes a guide body mountable to the back portion of a seat, and means for adjusting the webbing laterally in position, inward or outward, relative to a seat, to vary the path of the shoulder strap across the body. The path of the shoulder strap may, thus, be varied by the occupant to minimize neck chafing and/or shoulder pressure. The means for adjusting the webbing is supported by the guide body. In accordance with the present invention, the means for adjusting the webbing preferably includes a guide arm extending from the guide body; an adjustable webbing locator adjustably disposed on the guide arm, extending generally parallel thereto, and having a length suitable to guide the webbing of a safety belt passing therebetween; and means for positioning the webbing locator on the guide arm.

The present invention further includes a vehicle seat belt system incorporating a functional, adjustable webbing guide for a shoulder strap, as described above, which includes means for adjusting the webbing laterally in position relative to a seat, to vary the path of the shoulder strap across the body of the occupant for comfort.

Lateral positioning of the webbing of the shoulder strap permits occupants of other than average dimensions to adjust the path of a shoulder strap for comfort, inhibiting neck chafing and/or shoulder pressure, while maintaining a snug fit diagonally across the body. The present invention, thus, takes a different approach to shoulder strap adjustment which is both inexpensive and easy to use.

BRIEF DESCRIPTION OF THE DRAWINGS

FIG. 3 is a top view of the belt guide of the present invention taken along line 3—3 in FIG. 2.

FIG. 4 is a detailed cross-sectional view of the preferred means for positioning taken along line 4—4 in FIG. 3.

DETAILED DESCRIPTION OF THE PREFERRED EMBODIMENTS

Figure 1:
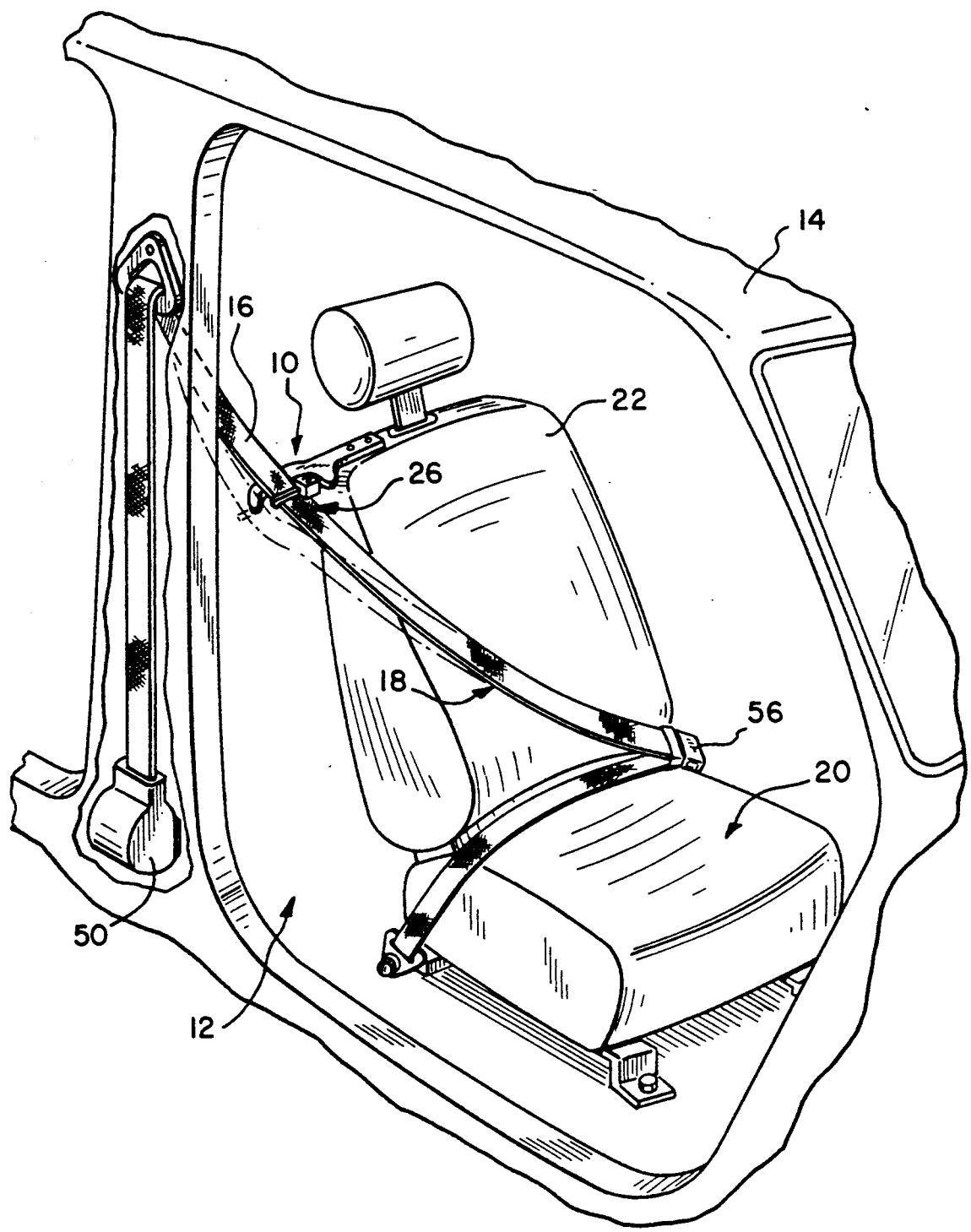
FIG. 1 is a perspective view of the present invention in an environment of use.

Referring to FIG. 1, the adjustable belt guide 10 of the present invention is shown, installed as part of a seat belt system 12 in a vehicle such as an automobile 14, which is its primary, intended environment of use.

Figure 2:
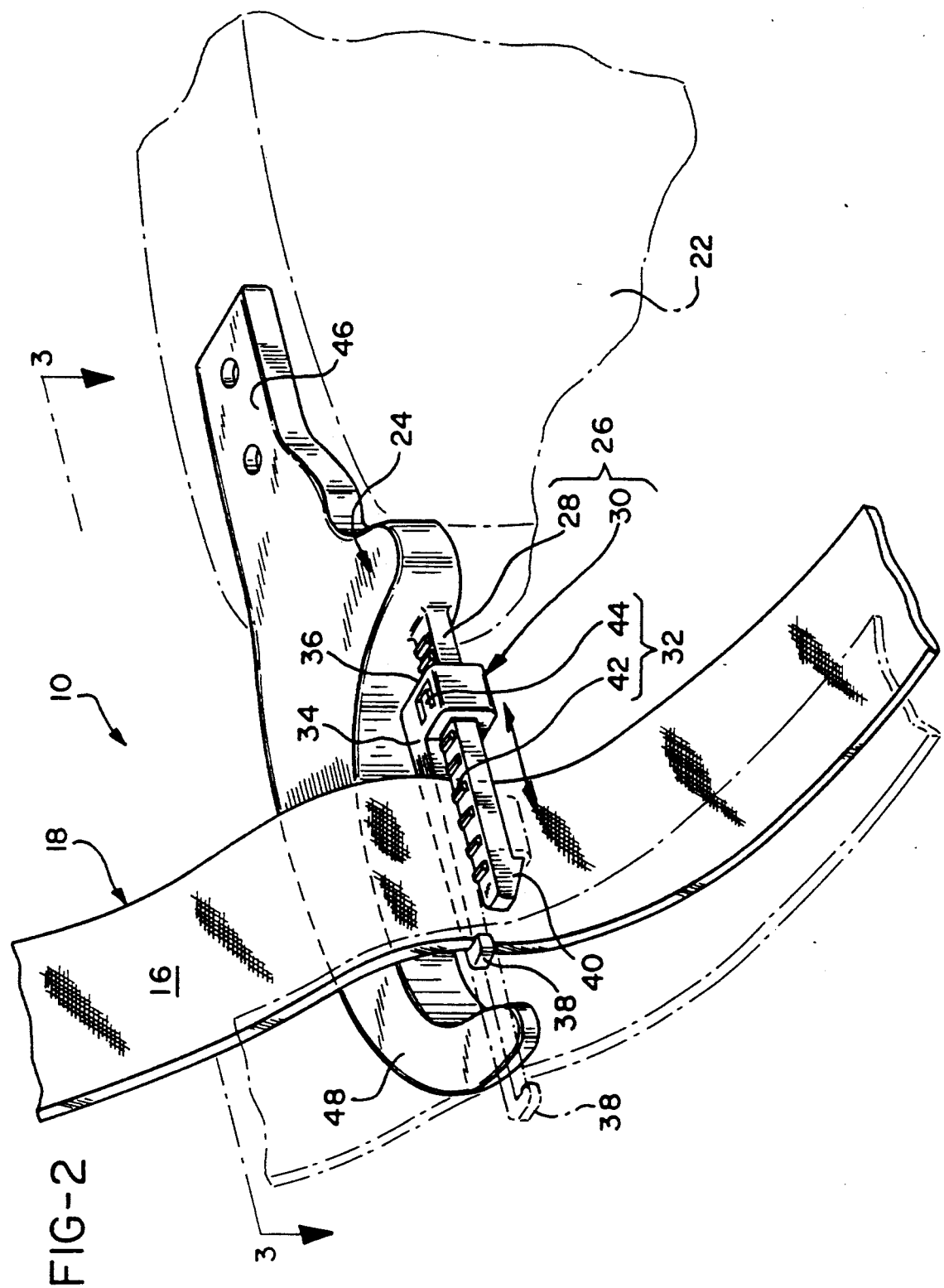
FIG. 2 is a detailed perspective view of the belt guide of the present invention shown in FIG. 1.

As shown in FIGS. 1 and 2, the belt guide 10 receives the webbing 16 of a shoulder strap 18 of the vehicle seat belt system 12, and adjustably directs the path of the shoulder strap 18 across the body of an occupant (not shown) of a seat 20 for comfort. While use with a shoulder strap 18 is preferred, the belt guide 10 may equally be used to receive at least a portion of the webbing 16 and adjust the path of any strap or belt of a seat belt system 12 in a vehicle. Thus, the belt guide 10 is also referred to herein as a webbing guide.

Shown best in FIG. 2, the adjustable belt guide 10 includes a guide body 24 mountable to the back portion 22 of the seat 20, and means 26 for adjusting the webbing 16 laterally in position, inward or outward, relative to the seat 20. The means 26 for adjusting the webbing thereby allows the occupant to vary the path of the shoulder strap 18 across their body to minimize bothersome neck chafing and/or shoulder pressure caused by the shoulder strap 18. The means 26 for adjusting the webbing is supported by the guide body 24.

Referring to FIGS. 2 and 3, in accordance with the present invention, the means 26 for adjusting the webbing preferably includes a guide arm 28 extending from the guide body 24, a webbing locator 30 adjustably disposed on the guide arm 28, and means 32 for positioning the webbing locator 30 on the guide arm 28. As shown, the webbing locator 30 preferably extends generally parallel to the guide arm 28, and has a length suitable to receive and guide the webbing 16 of the shoulder strap 18 passing between the guide arm 28 and webbing locator 30. The length of the webbing locator 30 preferably is at least as great as the width of webbing 16. The means 32 for positioning the webbing locator 30 permits the webbing locator 30 to guide the webbing 16 laterally relative to a seat 20, as shown in FIG. 2.

While the webbing locator 30, guide arm 28 and means 32 for positioning may take on somewhat different forms, in accordance with the preferred embodiment of FIGS. 2 and 3 the webbing locator 30 includes a locator arm 34 extending from the guide arm 28 and oriented generally parallel to the guide arm 28, and means 36 for adjustably connecting the locator arm 34 to the guide arm 28, such as the loop shown. Preferably, the webbing locator 30 further includes a webbing stop 38 at one end to urge the webbing 16 to remain between the webbing locator 30 and guide arm 28.

The guide arm 28 preferably also includes a travel stop 40 disposed at one end of the guide arm 28 to limit the range of positions available and retain the webbing locator 30 on the guide arm 28. Many different means 32 for positioning the webbing locator 30 are possible in accordance with the present invention, for adjusting the position of one component along the other. The choice of such means 32 for positioning the webbing locator 30 is not critical to the present invention. As shown in FIGS. 3 and 4, the means 32 for positioning the webbing locator 30 preferably includes a series of teeth 42, detents or serrations on at least a portion of the surface of the guide arm 28, and a means 44 for engaging at least one of the teeth 42, detents or serrations included in part of the webbing locator 30, such as the loop shown. Other means 44 for engaging at least one of the teeth 42 may be used, such as spring-loaded devices known in the art, or corresponding surfaces which provide a friction or interference fit, and the preferred embodiment is representative of means 32 for positioning which may be used. It is desirable only that the means 32 for positioning the webbing locator 30 be sufficiently secure to prevent undesired sliding of the webbing locator 30, while being sufficiently easy to operate, particularly by smaller sized occupants of a seat 20.

As further seen in FIG. 2 the guide body 24 of the belt guide 10 includes a mounting flange 46 for attachment of the guide body 24 to the back portion 22 of the seat 20, such that the guide arm 28 and adjustable webbing locator 30 extend generally laterally from the seat 20. As shown in FIGS. 2 and 3, the guide body 24 preferably includes a generally C-shaped portion 48, with the means 26 for adjusting the webbing extending generally across the opening of the C-shaped portion 48. The C-shaped portion 48 provides back-up support for the means 26 for adjusting the webbing, and provides an alternate, fixed webbing guide for the webbing 16 of shoulder strap 18.

In a further aspect of the present invention, a vehicle seat belt system 12 is provided which includes an adjustable belt guide 10 in accordance with the present invention, as shown in FIG. 1. Preferably for a seat 20 in an automobile 14, the vehicle seat belt system 12 further includes at least a strap; means 50 for tensioning the strap, such as a spring-loaded recoiling, tensioning device at one end of the strap; and means 52 for securing the strap at the opposite end thereof, such as a conventional seat belt buckle. In the preferred embodiment of FIG. 1, the strap is a shoulder strap 18, and the webbing 16 of the shoulder strap 18 is received by the belt guide 10 and directed diagonally across an occupant of the seat 20. Preferably, the vehicle seat belt system 12 also includes a lap belt 54. The belt guide, as set forth above and shown in FIG. 2, includes a guide body 24 mountable to the back portion 22 of the seat 20, and means 26 for adjusting the webbing 16 laterally in position, inward or outward, relative to the seat 20. As before, the means 26 for adjusting the webbing allows the occupant of the seat 20 to vary the path of the shoulder strap 18 for comfort, to minimize neck chafing and/or shoulder pressure caused by the shoulder strap 18. The means 26 for adjusting the webbing is as disclosed above.

Preferably, the belt guide 10 of the present invention is made of conventional, tough, wear-resistant polymer resins for light-weight and formability. However, the belt guide 10 may equally be constructed of other materials, for example, aluminum. The materials used for other parts of the vehicle seat belt system 12 are conventional.

While certain representative embodiments and details have been shown and described for purposes of illustrating the invention, it will be apparent to those skilled in the art that various changes in the apparatus and system disclosed herein may be made without departing from the scope of the invention, which is defined in the appended claims.

What is claimed is:

1. An adjustable webbing guide for receiving the webbing of a shoulder strap of a vehicle seat belt system and directing said shoulder strap across the body of an occupant of a seat, said adjustable webbing guide comprising:
    a guide body mountable to the back portion of a seat; and
    means attached to said guide body for adjusting the webbing laterally in position relative to said seat to vary the path of said shoulder strap across the body of said occupant, said means for adjusting the webbing comprising;
    a guide arm extending from said guide body,
    an adjustable webbing locator adjustably disposed on said guide arm, extending generally parallel thereto, and having a length suitable to guide the webbing of a safety belt passing therebetween, and
    means for positioning said webbing locator on said guide arm,
    whereby the location of said webbing on said guide arm may be adjusted laterally to vary the path of said shoulder strap across the body of said occupant.

2. The adjustable webbing guide of claim 1 wherein said guide body includes a mounting flange for attachment of said guide body to said back portion of said seat, such that said guide arm and said adjustable webbing locator extend generally laterally from said seat.

3. The adjustable webbing guide of claim 1 wherein:
    said guide body includes a generally C-shaped portion; and
    said means for adjusting the webbing, extends generally across the opening of said C-shaped portion.

4. The adjustable webbing guide of claim 1 wherein said webbing locator comprises:
    a locator arm extending from said guide arm generally parallel thereto; and
    means for adjustably connecting said locator arm to said guide arm.

5. The adjustable webbing guide of claim 4 wherein said means for adjustably connecting comprises a loop.

6. The adjustable webbing guide of claim 1 wherein said webbing locator includes a webbing stop at one end to urge said webbing to remain between said webbing locator and said guide arm.

7. The adjustable webbing guide of claim 1 wherein said means for positioning said webbing locator comprises:
    a series of teeth disposed on at least a portion of the surface of said guide arm; and
    means for engaging at least one of said teeth disposed on said webbing locator.

8. The adjustable webbing guide of claim 1 wherein said means for positioning said webbing locator comprises:
    a plurality of serrations on at least a portion of the surface of said guide arm; and
    means for engaging at least one of said serrations disposed on said webbing locator.

9. The adjustable webbing guide of claim 1 wherein said means for positioning said webbing locator includes a travel stop disposed at one end of said guide arm to limit the adjustment of said webbing locator along said guide arm.

10. An adjustable webbing guide for receiving the webbing of a shoulder strap of a vehicle seat belt system and for directing said shoulder strap across the body of an occupant of a seat, said adjustable webbing guide comprising:
- a guide body mountable to the upper back portion of a seat;
- a guide arm extending from said guide body in a generally lateral direction relative to said seat;
- an adjustable webbing locator adjustably disposed on said guide arm, extending generally parallel thereto, and having a length suitable to guide the webbing of a safety belt passing between said webbing locator and said guide arm; and
- means for positioning said webbing locator on said guide arm to adjust the location of said webbing on said guide arm and laterally position said webbing relative to said seat.

11. A vehicle set belt system for a seat including at least a strap, means for tensioning said strap at one end thereof, and means for securing said strap at the opposite end thereof, and an adjustable webbing guide mounted to the back portion of said seat, such that the webbing of said strap is received therein and directed across an occupant of said seat, and such that its path thereacross may be adjusted for comfort, said adjustable webbing guide comprising:
- a guide body mountable adjacent to said seat for receiving a portion of the webbing of said strap; and
- means disposed on said guide body for adjusting the webbing in position relative to said seat to vary the path of said strap across the body of said occupant, said means for adjusting the webbing comprising;
  - a guide arm extending from said guide body in a generally lateral direction relative to said seat,
  - an adjustable webbing locator adjustably disposed on said guide arm for lateral motion relative to said seat, said webbing locator extending generally parallel to said guide arm, and having a length suitable to guide said webbing of said safety belt passing between said webbing locator and said guide arm, and
  - means for positioning said webbing locator on said guide arm to adjust the location of said webbing thereon and laterally position said webbing relative to said seat to vary the path of said strap across the body of said occupant.

12. The vehicle seat belt system of claim 11 wherein said strap comprises a shoulder strap, said webbing of said shoulder strap is received in said adjustable webbing guide and directed diagonally across an occupant of said seat, and said means disposed on said guide body for adjusting the webbing adjusts said webbing laterally relative to said seat.

13. The vehicle seat belt system of claim 11 wherein said webbing locator comprises:
- a locator arm extending from said guide arm in generally parallel relationship thereto; and
- means for adjustably connecting said locator arm to said guide arm.

14. The vehicle seat belt system of claim 11 wherein said means for positioning said webbing locator comprises:
- a plurality of teeth on at least a portion of the surface of said guide arm;
- means for engaging at least one of said teeth disposed on said webbing locator; and
- a travel stop disposed at the end of said guide arm to limit the adjustment of said webbing locator along said guide arm.

* * * * *